(12) United States Patent
Jesionowski et al.

(10) Patent No.: US 6,185,165 B1
(45) Date of Patent: Feb. 6, 2001

(54) POSITIONABLE VISION INDICATORS FOR CONFIGURING LOGICAL LIBRARIES

(75) Inventors: Leonard George Jesionowski; Raymond Yardy, both of Tucson, AZ (US)

(73) Assignee: International Business Machines Corporation, Armonk, NY (US)

( * ) Notice: Under 35 U.S.C. 154(b), the term of this patent shall be extended for 0 days.

(21) Appl. No.: 09/121,848

(22) Filed: Jul. 24, 1998

(51) Int. Cl.[7] .................................................. G11B 17/22
(52) U.S. Cl. .............................................. 369/34; 700/214
(58) Field of Search ................................... 369/34, 30, 36, 369/37, 38, 39, 178; 300/92; 710/1, 13; 700/57, 64, 214, 213, 215

(56) References Cited

U.S. PATENT DOCUMENTS

| | | | |
|---|---|---|---|
| 5,059,772 | 10/1991 | Younglove | 235/383 |
| 5,303,214 * | 4/1994 | Kulakowski et al. | 369/34 |
| 5,426,581 * | 6/1995 | Kishi et al. | 364/167.01 |
| 5,450,385 | 9/1995 | Ellis et al. | 369/34 |
| 5,568,455 * | 10/1996 | Balsom | 369/30 |
| 5,581,522 | 12/1996 | Sibuya et al. | 369/36 |
| 5,613,154 | 3/1997 | Burke et al. | 395/821 |
| 5,729,464 * | 3/1998 | Dimitri | 364/478.03 |
| 5,819,309 * | 10/1998 | Gray | 711/111 |
| 5,870,732 * | 2/1999 | Fisher et al. | 707/1 |
| 5,956,198 * | 9/1999 | Kulakowski et al. | 360/71 |
| 5,956,301 * | 9/1999 | Dimitri et al. | 369/34 |
| 6,005,734 * | 12/1999 | Shimada et al. | 360/69 |
| 6,031,798 * | 2/2000 | James et al. | 369/34 |
| 6,038,490 * | 3/2000 | Dimitri et al. | 700/214 |
| 6,044,442 * | 3/2000 | Jesionowski | 711/153 |
| 6,064,543 * | 5/2000 | Tatsuda | 360/92 |
| 6,082,554 * | 7/2000 | Ostwald | 711/41.12 |

* cited by examiner

Primary Examiner—Tan Dinh
(74) Attorney, Agent, or Firm—John H. Holcombe; Robert M. Sullivan (57) ABSTRACT

Disclosed is a vision system for partitioning an automated data storage library into multiple logical libraries. The system includes a positionable vision indicator having logical library indicia, which is positioned at a location where it is desired to identify storage slots for a logical library. A reader is provided for reading the indicia and for locating the positionable vision indicator. A logical library controller assigns, in response to the indicia and the location, a sequential portion of the storage slots adjacent the location to one of the multiple logical libraries. Data storage drives and I/O slots may also be identified for logical libraries. The positionable vision indicator may comprise a dummy data storage media positionable in the storage slots. Alternatively, holders are at locations adjacent groups of the storage slots and the positionable vision indicator is a label support mountable on the holders. A snap-on label support assembly may be pressed onto and engage the holders. Alternatively, the holders have attachment surfaces, and the label support comprises a removably engageable element which may be moved into proximity with and engage the holders.

20 Claims, 10 Drawing Sheets

POSITIONABLE VISION INDICATORS FOR CONFIGURING LOGICAL LIBRARIES

TECHNICAL FIELD

This invention relates to automated data storage libraries which transport portable data storage media between storage slots and data storage drives, and, more particularly, to the configuration of an automated data storage library into multiple logical libraries for sharing the automated data storage library between multiple hosts.

BACKGROUND OF THE INVENTION

Automated data storage libraries are known for providing cost effective access to large quantities of stored data. Generally, data storage libraries include a large number of storage slots on which are stored portable data storage media. The typical portable data storage media is a tape cartridge or an optical cartridge. An accessor robot typically accesses the data storage media from the storage slots and delivers the accessed media to a data storage drive for reading and/or writing data on the accessed media. Suitable electronics both operate the accessor robot and operate the data storage drives to transmit and/or receive data from an attached on-line host computer system.

In a conventional automated data storage library, the storage slots are arranged in a planar orthogonal arrangement forming a "wall" of data storage media. The plane may be a flat plane, or may be cylindrical. To double the storage capacity, two "walls" of data storage media may be provided on either side of the accessor robot.

A number of different companies manufacture automated data storage libraries today, each model displaying various different features. Some automated data storage libraries offer the capability of sharing the entire library with a plurality of hosts. The IBM 3575 Tape Library Dataserver with Multi-Path Feature has the internal capability to allocate drives and storage slots and to handle contentions among the hosts for the same library components. The ATL Products PL50 Library Hub is directed to sharing a library among multiple hosts externally of the library. Hereinafter, the term "logical library controller" is used to refer to the controller with sharing capability, whether it is internal or external to the library.

Conventionally, the components of the automated data storage library, such as data storage drives and storage slots, are sequentially assigned to each of the hosts either automatically (and typically equally) or manually where the operator assigns numbers of the components to each logical library at the host terminal. The assignments are then utilized by the logical library controller for accessing media from the assigned storage slots and directing the accessor robot to deliver the media to the assigned data storage drives in the logical library for each of the separate hosts.

A logical library controller typically comprises a microprocessor, including a database, which may comprise a memory, and input/output adapters, such as SCSI ports. The database typically stores the programs (microcode) which cause the controller to operate the library, and include information indicating the characteristics of the particular library and the logical library assignments. The programs for the controller may be installed or updated by a typical input device, such as a CD-ROM optical drive, but the specific information characterizing the specific library and logical library assignments are typically unavailable externally and only appear in the manually entered database.

The controller memory may fail and require replacement. The microcode may be restored on the replacement memory by installing the microcode at the CD-ROM, but the specific information characterizing the specific library and the logical library assignments would be lost, and would have to be manually entered or manually selected. A difficulty is that there may be no record known by or available to the operator or the memory installer to identify the logical library assignments.

SUMMARY OF THE INVENTION

It is an object of the present invention to provide logical library assignment information for the logical library controller that is easily implemented and is available separately from the controller database.

Disclosed is a vision system for partitioning an automated data storage library, having a plurality of storage slots for storing data storage media, into multiple logical libraries. The system includes a positionable vision indicator having logical library indicia, which is positioned at a location where it is desired to identify storage slots for a logical library. A reader is provided for reading the indicia and for locating the positionable vision indicator, and a processor (logical library controller) is coupled to the reader, assigning, in response to the indicia and the location, a sequential portion of the storage slots adjacent the location to one of the multiple logical libraries.

Similarly, data storage drives and I/O slots may also be identified for a logical library.

In one embodiment, the data storage media have media indicia thereon, and the positionable vision indicator may comprise a dummy data storage media positionable in the storage slots, and the logical library indicia is readable by the same reader as the media indicia.

In another embodiment, holders are positioned at locations adjacent to groups of the storage slots and the positionable vision indicator is a label support having logical library indicia, and is mountable on the holders. The positionable vision indicator label support may comprise a snap-on label support assembly which may be pressed onto and engage the holders. Alternatively, the holders may comprise a magnetically permeable attachment surface, and the positionable vision indicator label support comprises a magnet which may be moved into proximity with and magnetically engage the holders.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
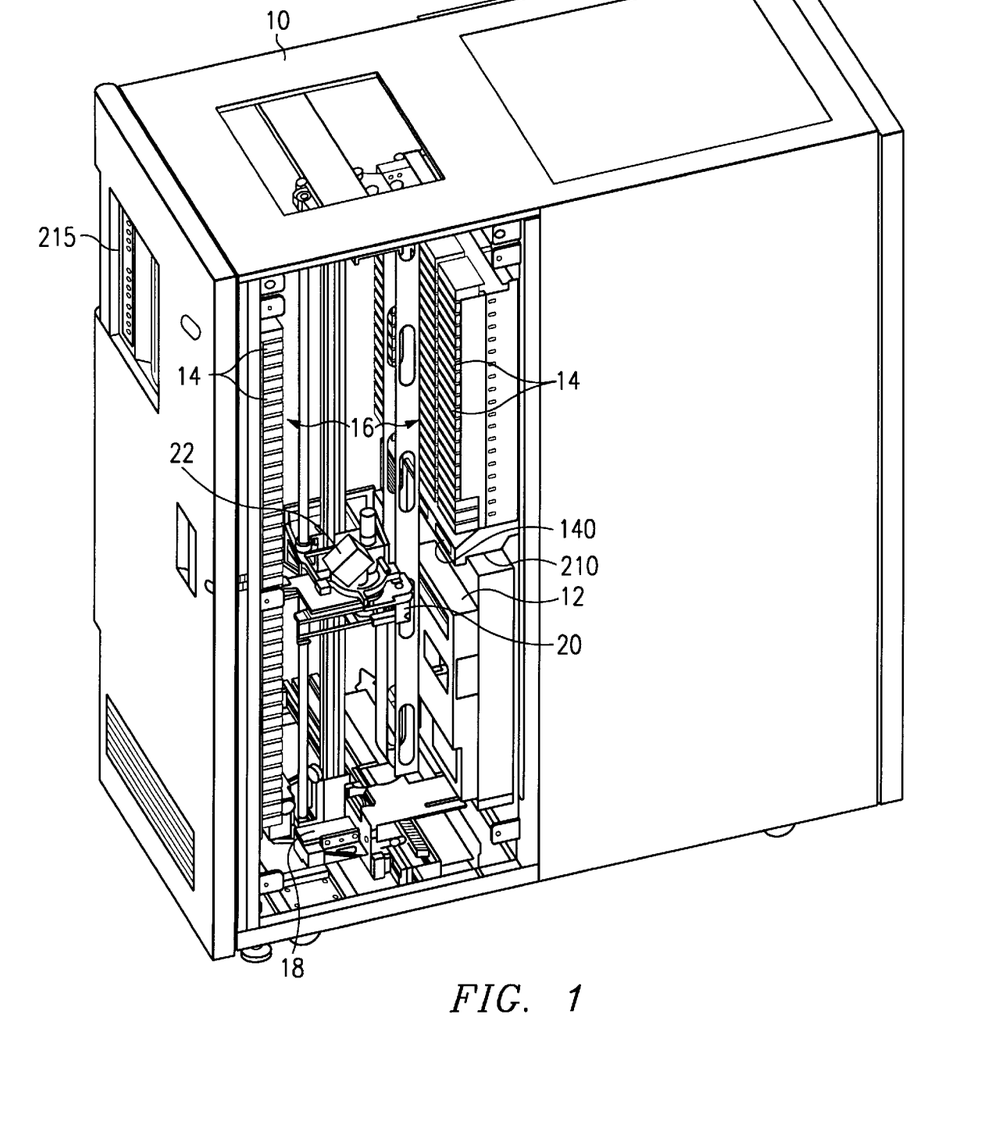
FIG. 1 is a perspective view of an automated data storage library employing the positionable vision indicators of the present invention.

Referring to FIG. 1, an automated data storage library is illustrated employing the positionable vision indicators for configuring logical libraries of the present invention. The automated data storage library includes a plurality of data storage drives 12, for example, for reading and/or writing on data storage media, such as magnetic tape cartridges. The present invention is equally applicable to automated data storage libraries which store any type of data storage media. A plurality of data storage media 14 are stored in banks or groups of storage slots 16. Data storage media may encompass a variety of media, such as magnetic tape cartridges, magnetic tape cassettes, optical tape cartridges, optical disk cartridges of various types, including ROM, WORM and rewritable, and in various formats. For universal reference to any of these types of media, the terms "data storage media" or "media" are used herein.

An accessor robot 18, including a cartridge picker 20 and a bar code reader 22 mounted on the picker, transports a selected cartridge 14 between a storage slot 16 and a drive 12.

An example of an automated data storage library 10 which internally configures the library into multiple logical libraries is the IBM 3575 Tape Library Dataserver with Multi-Path Feature, which stores magnetic tape cartridges.

Figure 2:
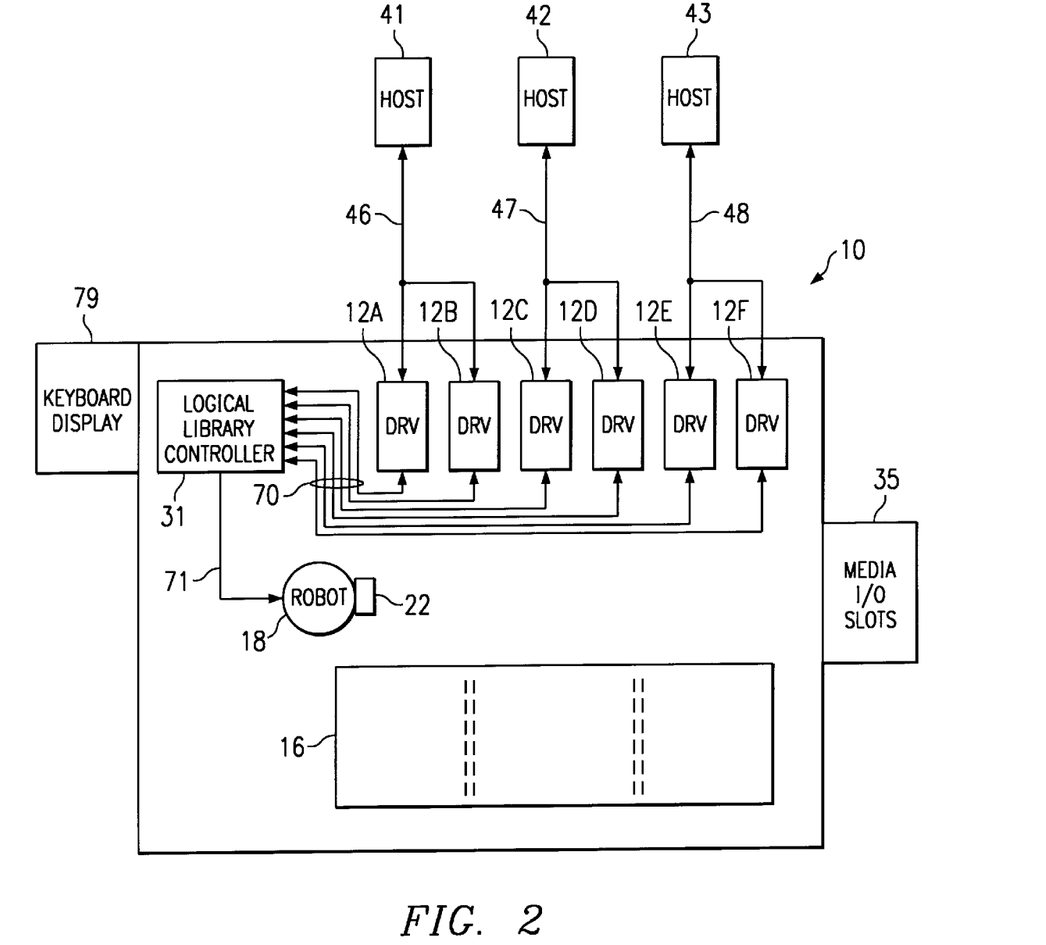
FIG. 2 is a diagrammatic representation of a system including the automated data storage library of FIG. 1 and multiple hosts for internally configuring into multiple logical libraries in accordance with the present invention.

The library 10 which configures the logical libraries internally is illustrated in FIG. 2. The library includes a logical library controller 31 which comprises at least one microprocessor. The library controller may serve both to provide the inventory of the entire library and to control the library. Typically, the logical library controller 31 comprises a data processor and suitable data memory and data storage capability to control the operation of the library 10. The logical library controller 31 may comprise any suitable microprocessor, such as an IBM POWER-PC processor.

Referring to FIGS. 1 and 2, the logical library controller 31 controls the actions of the accessor robot 18. The conventional library controller 31 is interconnected via the drives 12 to host processors to provide commands requesting access to particular data storage media or to media in particular storage slots. Commands for access to data or to locations on the data storage media and information to be recorded on, or to be read from, selected data storage media are typically transmitted directly between the drives 12 and the host. The library controller 31 is typically provided with a database, which includes tables and programs.

The accessor robot 18 typically includes servos, motors, arms, the picker 20 with grippers, sensors and other robotic, mechanical and electrical equipment to perform functions that include (at least) the accessing and transporting of data storage media between and among the storage slots 16 and the data storage drives 12. Optionally, media I/O slots 35 may be provided allowing the import of data storage media into the library 10 or the export of data storage media out from the library. The accessor robot also transports data storage media between the media I/O slots 35 and the storage slots 16 or the data storage drives 12.

Referring to FIG. 2, multiple hosts, for example, 3 hosts 41–43, are available to share the automated data storage library 10. Each of the hosts 41–43 is connected to at least one of the data storage drives 12A–12F by means of a data path 46–48. The hosts 41–43 may comprise workstations, personal computers, servers, or other data processing hosts capable of exchanging data and control signals with the automated data storage library 10. As an example, the hosts 41–43 may comprise servers such as an IBM RS/6000 computing server with an IBM POWER-PC processor.

In the embodiment of FIG. 2, the sharing of the automated data storage library 10 amongst the hosts 41 and 43 is implemented internally in the logical library controller 31. Each of the hosts 41–43 is connected to the logical library controller 31 paths by means of data paths 46–48 via drives 12 and path 70. The logical library controller is coupled to the robot 18 and to the bar code reader 22 over paths 71.

Alternatively, the library may be shared among multiple hosts by an external logical library controller. An example is the ATL Products PL50 Library Hub, which stores magnetic tape cartridges.

Figure 3:
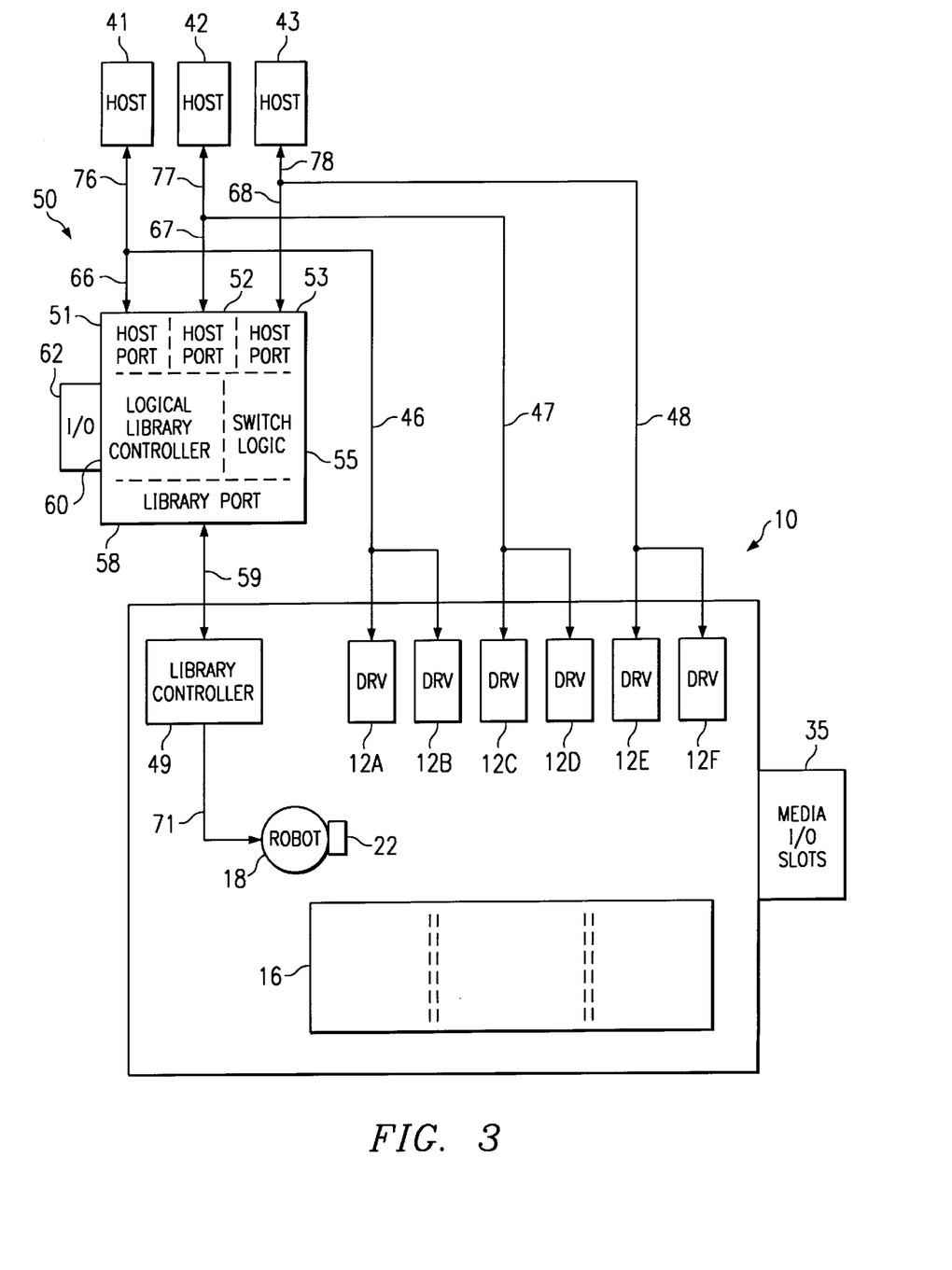
FIG. 3 is a diagrammatic representation of a system including the automated data storage library of FIG. 1 and multiple hosts for externally configuring into multiple logical libraries in accordance with the present invention.

An embodiment of a library 10 which configures the logical libraries externally is illustrated in FIG. 3. The library is similar to that of FIG. 2, except that library controller 49 is not coupled to the drives 12A–12F and is coupled only to the robot 18 and to the bar code reader 22 over paths 71.

In the embodiment of FIG. 3, the sharing of the automated data storage library 10 amongst the hosts 41–43 is implemented externally of the library in a multiplexor switch 50. The multiplexor switch comprises a plurality of input/output ports 51–53, which may be switched by switch logic 55 to be interconnected with ones of other input/output ports, and one input/output port 58 is employed to connect to automated data storage library 10 over cable or bus 59. The multiplexor switch 50 also comprises a logical library controller microprocessor 60 which may be a programmable computer processor, and may comprise an input/output station 62, such as a keyboard and display.

Still referring to FIG. 3, each of the hosts 41–43 is individually connected to a separate one of the input/output ports 51–53 by means of a control path 66–68. The input/output ports 51–53 are termed "host ports" for ease in defining the present invention. In the specific example illustrated in FIG. 3, the connections all comprise SCSI connections. Thus, busses 76–78 are provided and are combined control and data paths serving as both control paths 66–68 and data paths 46–48.

The configuration of the library 10 into a plurality of logical libraries may be conducted by various means. As illustrated in the embodiment of FIG. 2, the configuration is implemented in library controller 31, and, as illustrated in the embodiment of FIG. 3, may alternatively be implemented in a processor 60 external to the automated data storage library 10. The data storage library is partitioned into multiple logical libraries for access by the plurality of hosts 41–43, respectively. The partitioning comprises configuring the library to assign certain ones of the data storage drives 12A–12F to respective ones of the logical libraries, and also to assign certain ones of the storage slots 16 and optionally I/O slots 35 to respective ones of the logical libraries.

Conventionally, the components of the automated data storage library 10, such as data storage drives 12 and storage slots 16, are sequentially assigned to each of the hosts either automatically (and typically equally) or manually where the operator assigns numbers of the components to each host at a library keyboard display terminal 79 in FIG. 2, or at terminal 62 if FIG. 3. The assignments are then utilized by the logical library controller 31 in FIG. 2 or 60 in FIG. 3 for accessing media from the assigned storage slots and directing the accessor robot to deliver the media to the assigned data storage drives in the logical library for each of the separate hosts.

A logical library controller typically comprises a microprocessor, including a database, which may comprise a memory, and input/output adapters, such as SCSI ports. The database typically stores the programs (microcode) which cause the controller to operate the library, and include information indicating the logical library assignments. The programs for the controller may be installed or updated by a typical input device, such as a CD-ROM optical drive, but the specific information characterizing the logical library assignments are typically unavailable externally and only appear in the manually entered database.

The logical library controller memory may fail and require replacement. The microcode may be restored on the replacement memory by installing the microcode at the CD-ROM, but the specific information characterizing the logical library assignments would be lost, and would have to be manually entered or manually selected. As discussed above, there may be no record known by or available to the operator or the memory installer to identify the logical library assignments.

The present invention provides logical library assignment information for the library controller that is easily implemented and is available separately from the controller database.

Figure 4:
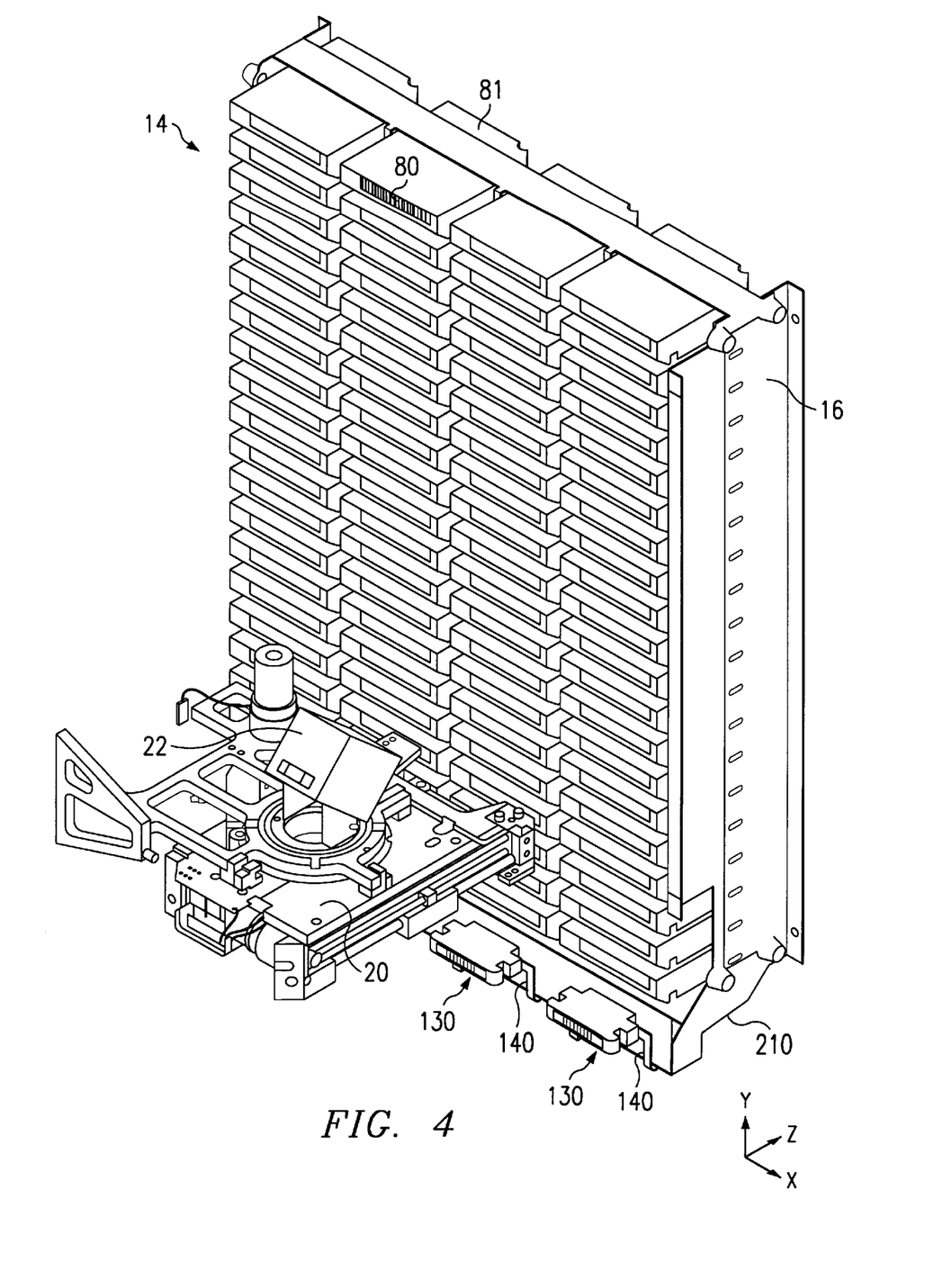
FIG. 4 is an illustration of the robot picker and bar code reader in proximity to a bank of storage slots of FIG. 2.
Figure 5:
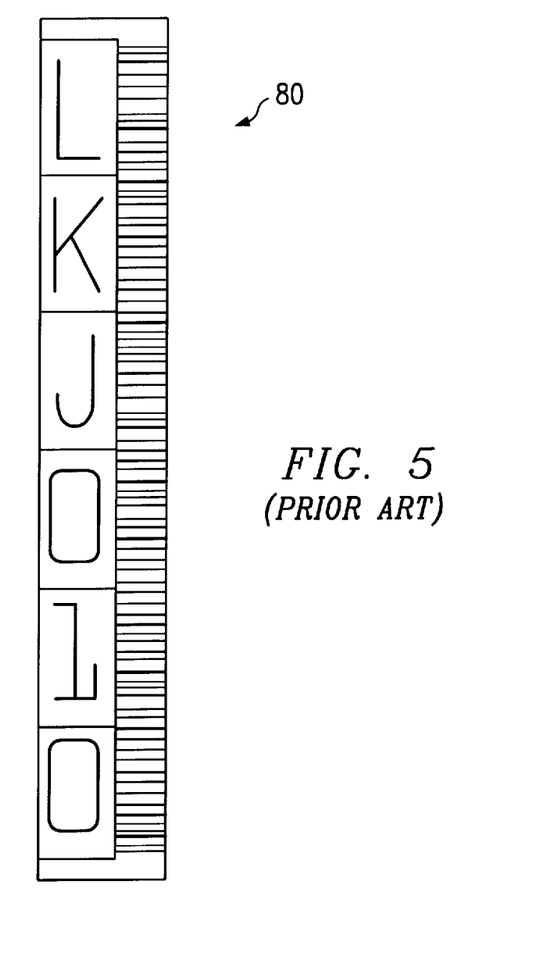
FIG. 5 is an illustration of the prior art media label affixed to magnetic tape cartridge media.

Referring to FIG. 4, as taught by coassigned U.S. Pat. No. 5,426,581, an automated data storage library having a bar code reader 22 mounted on the picker 20, employed to identify data storage media 14, may additionally use the bar code reader to calibrate the positioning of the picker, so that the picker may correctly access the desired data storage media from the storage slots. Referring additionally to FIG. 5, the typical media includes a bar code media identifier 80 (see medium 81 in FIG. 4) on an edge thereof which may be read by the bar code reader 22 as the media is stored at a storage slot 16. The identifier of a data storage media is typically read by the bar code reader 22, and the identifier is provided to the library controller for verifying that the picker 20 is positioned so as to access the correct media.

As taught by the '581 patent, the same bar code reader may also be employed to detect a target to both calibrate the bar code reader beam and calibrate the positioning of the picker. Thus, referring to FIGS. 1–4, the accessor robot 18 may position the picker 20 to any known X-Y location and the viewing location of the bar code reader 22 will be known.

In accordance with the present invention, logical library assignment information for configuration of the logical libraries by the library controller is provided that is easily implemented and that is available separately from the controller database. Specifically, positionable vision indicators, each having logical library indicia, are positioned at selected locations at the storage slots, for example, by the accessor robot 18. Alternatively, a door may be opened and the positionable vision indicators may be manually positioned. The accessor robot and a reader, for example, bar code reader 22, locate the positionable vision indicators and read the logical library indicia. In response to the indicia and the locations, the library may be autoconfigured into logical libraries by mapping the storage slots to the multiple logical libraries in contiguous sequential groups between the positionable vision indicators. Similarly, the I/O slots may be assigned by positionable vision indicators, and, additionally, the data storage drives may be assigned by use of drive positionable vision indicators.

Figure 6:
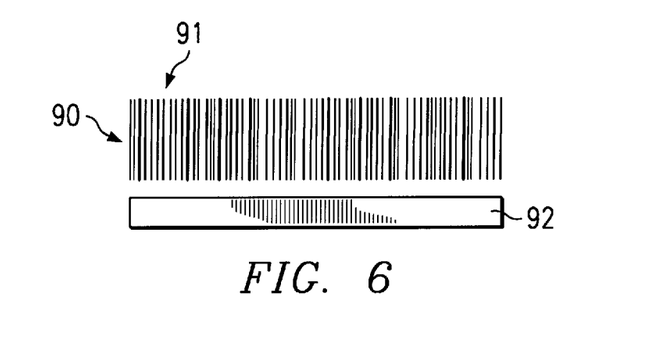
FIG. 6 is an illustration of an embodiment of a positionable vision indicator label of the present invention.

Referring to FIG. 6, an embodiment of a positionable vision indicator may comprise a label 90 having a bar code logical library indicia 91 or other machine readable indicia 92. It is anticipated that the more economical embodiment will comprise manually selecting and positioning the positionable vision indicators with labels 90. However, an embodiment which is relatively easy to implement is to operate the robot to engage and position positionable vision indicators wherein, as shown in FIGS. 6, 7A and B, and 8A and B, the label 90 may be mounted on dummy cartridges or cassettes that fit in the storage slots of the library.

Figure 7A:
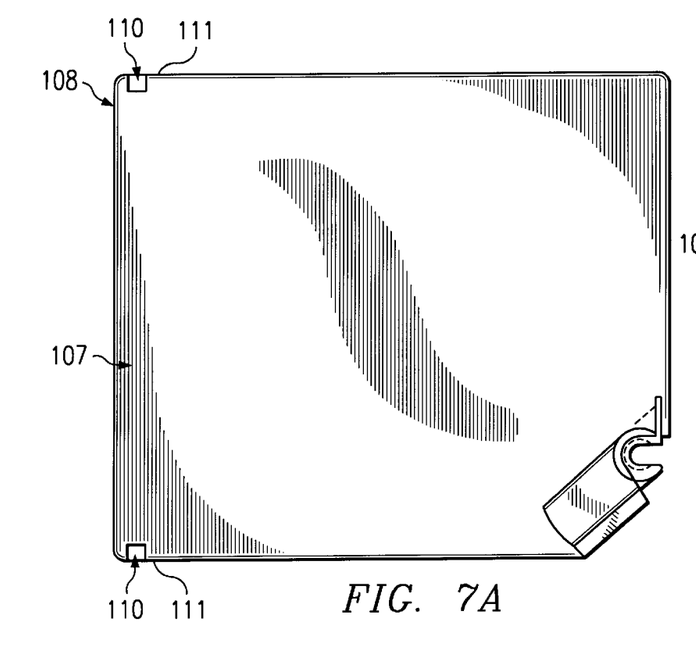
FIGS. 7A and 7B are respectively top and end views of a dummy magnetic tape cartridge positionable vision indicator in accordance with the present invention.
Figure 7B:
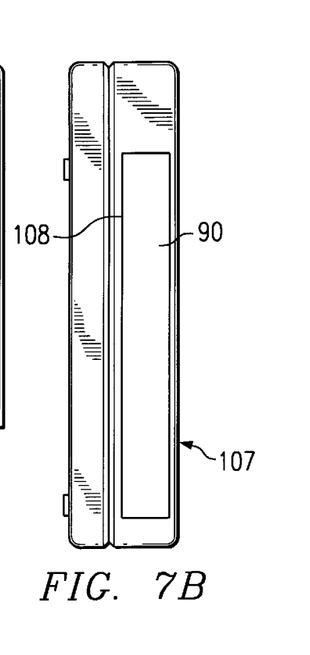
Figure 8A:
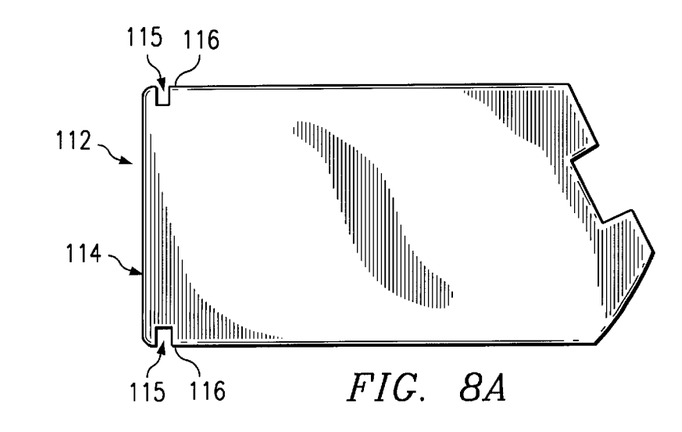
FIGS. 8A and 8B are respectively top and end views of a dummy magnetic tape cassette positionable vision indicator in accordance with the present invention.
Figure 8B:
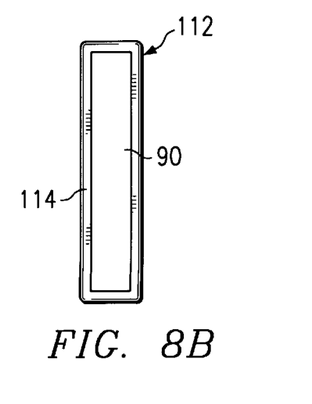

In FIGS. 7A and 7B, a dummy magnetic tape cartridge 107 having the label 90 on an outer edge 108, is manually selected, or may be engaged by the accessor robot picker 20 at notches 110 or surfaces 111 for delivery to a storage slot 16 or an I/O slot 35. The label on edge 108 is thus visible to the bar code reader 22. In FIGS. 8A and 8B, a dummy magnetic tape cassette 112 is illustrated, having the label 90 on an outer edge 114, and the dummy cartridge is manually selected, or may be engaged by the accessor robot picker at notches 115 or surfaces 116, for delivery to a storage slot or an I/O slot. Optionally, dummy optical disk cartridges may be fitted with labels. Other examples of dummy cartridges, etc., may be easily envisioned by those of skill in the art.

Data storage drives 12 may be designated by utilizing a data storage slot 16 immediately adjacent the data storage drive.

Figure 9A:
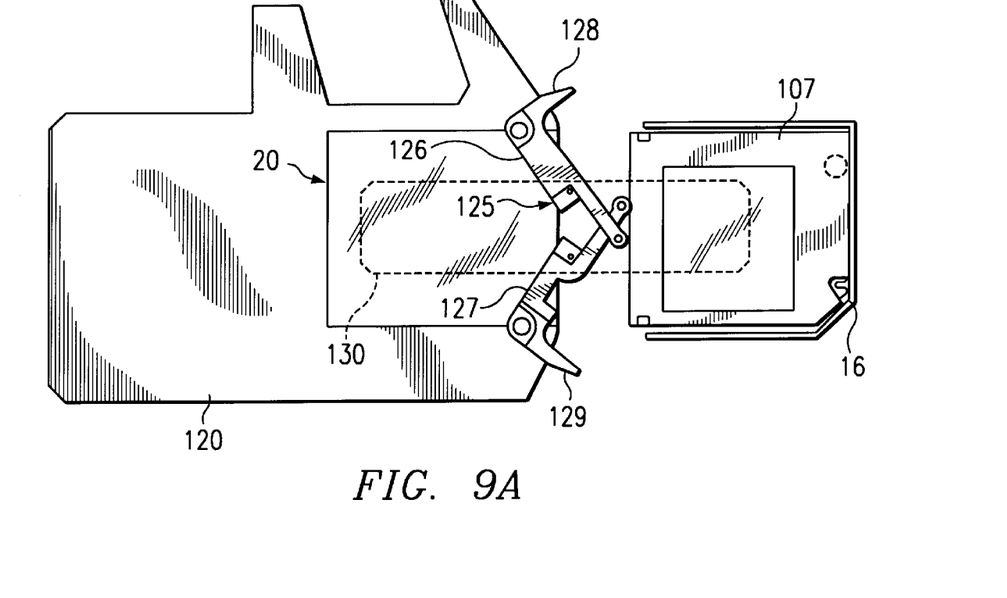
FIGS. 9A and 9B are respectively top views of alternative examples of robot picker of FIG. 4.
Figure 9B:
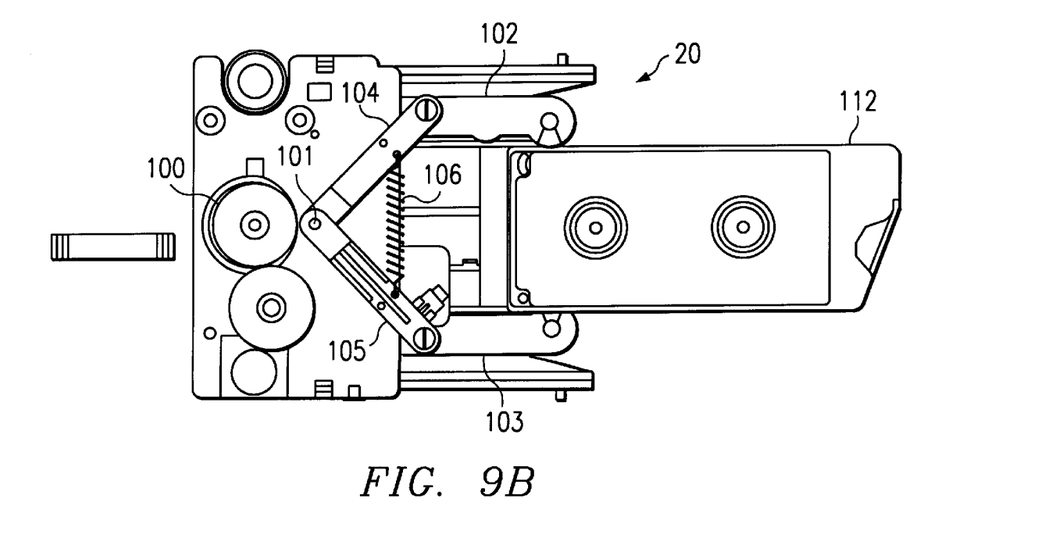

FIGS. 9A and 9B illustrate alternative examples of a conventional picker 20 as it delivers a dummy magnetic tape cartridge 107 or cassette 112 to a storage slot 16.

In FIG. 9A, the picker 20 is mounted on a support plate 120 and incorporates a gripper assembly 125. The gripper assembly includes two arms 126 and 127 with, respectively, fingers 128 and 129 for engaging the notches 110 of the dummy cartridge 107. The cartridge 107 is supported by an extensible plate 130 as it is carried by the picker 20 and delivered to the storage slot 16.

In FIG. 9B, the picker 20 comprises gripper fingers 102 and 103 which are operated by two arms 104 and 105. The arms are pulled by spring 106 to bring the fingers 102 and 103 into engagement with the side surfaces 116 of the dummy cassette 112. A cam 100 engages follower 101 to release the cassette after it is delivered to the storage slot 16.

Figure 10:
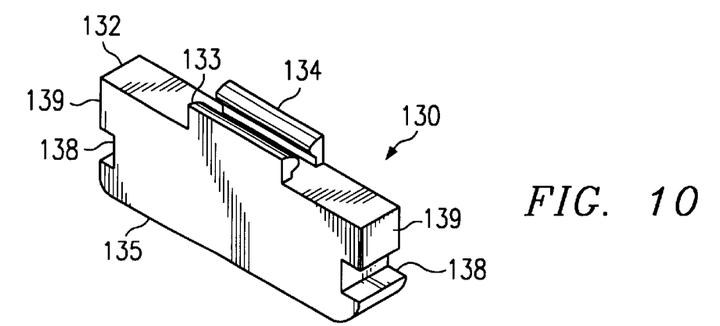
FIG. 10 is an embodiment of a positionable vision indicator in accordance with the present invention.
Figure 11:
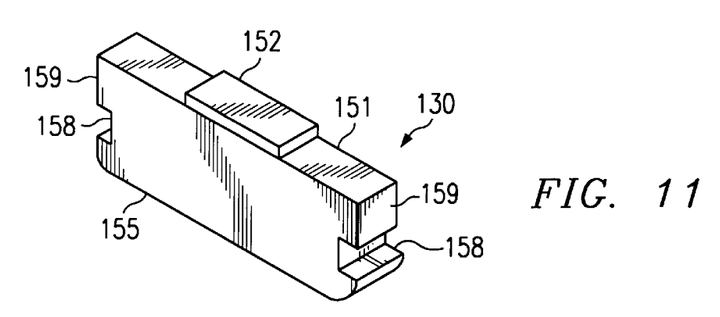
FIG. 11 is an alternative embodiment of a positionable vision indicator in accordance with the present invention.
Figure 12:
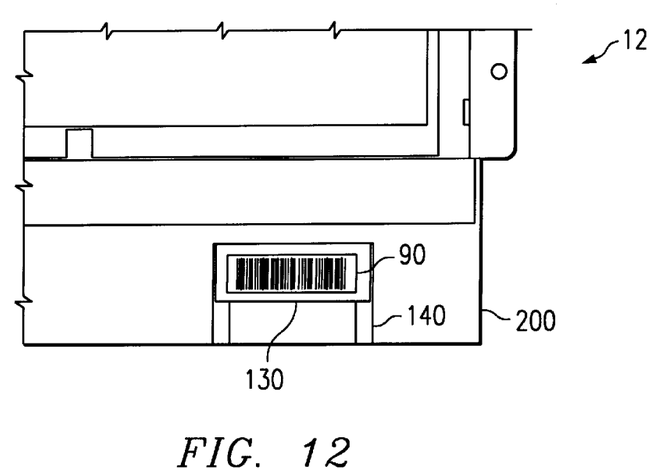
FIG. 12 illustrates a positionable vision indicator of FIGS. 10 and 11 mounted on a holder in accordance with the present invention.

Alternative examples of a positionable vision indicator which are best employed by manually positioning, are illustrated in FIGS. 10, 11 and 12. In FIG. 10, the positionable vision indicator comprises a positionable vision indicator label support 130 which is a snap-on label support assembly 132 with ears 133 and 134 which may be pressed onto and engages a holder 140 in FIG. 12. The indicator label 90 is mounted on surface 135 of the positionable vision indicator label support 130. Notches 138 and surfaces 139 may be provided to allow the picker to engage the label support 130 and deliver it to a holder 140 for positioning at the holder location, where the picker pushes the label support 130 onto the holder so that the support ears 133 and 134 are pressed onto and engage the holder 140 in FIG. 12.

Another example of a positionable vision indicator label support 130 is illustrated in FIG. 11. The holders 140 of FIG. 12 comprise a magnetically permeable attachment surface, and the positionable vision indicator label support 130 is a label support assembly 151 which includes a magnet 152 that may be manually moved into proximity with and magnetically engages the holders. The indicator label 90 is mounted on surface 155 of the positionable vision indicator label support assembly 151. Notches 158 and surfaces 159 may be provided to allow the picker of the accessor robot to engage the label support assembly 151 and the robot delivers it to a holder 140 for positioning at the holder location, where the picker brings the label support 151 into close proximity with the holder so that the magnet 152 magnetically engages the holder 140 in FIG. 12.

As further alternatives, element 152 in FIG. 11 may comprise an adhesive material which may removably engage the attachment surface of the holders, or may comprise a Velcro type of material to removably engage a similar material on the attachment surface of the holders. Hereinafter the element 152 will be characterized as a removably engageable element.

In FIG. 12, the holder 140 is illustrated as supported by bracket 200 on a data storage drive 12, allowing the positionable vision indicator label support 130 to configure a logical library with the adjacent data storage drive, using the indicia on label 90 and the location of the holder 140.

Referring to FIG. 4, holders 140 are illustrated as supported by bracket 210 adjacent banks of storage slots 16, allowing the positionable vision indicator label supports 130 to configure a logical library with the adjacent storage slots, using the indicia on label 90 and the locations of the holders 140. Bracket 210 is also located adjacent the I/O slots 35 for configuring the I/O slots.

Referring to FIG. 1, the positionable vision indicators (dummy cartridges 102 or 107, dummy cassettes 112, or label supports 132 or 151, etc.) are repositioned, but additional portable vision indicators may be stored in slots 215 when not utilized to customize the library. In order to customize the library, the operator selects a positionable vision indicator from its previous position or a slot 215 and delivers the positionable vision indicator to the desired location at a storage slot, at an I/O slot, or at a data storage drive. Alternatively, the accessor robot may be employed to select and position the positionable vision indicators.

Figures 13, 14:
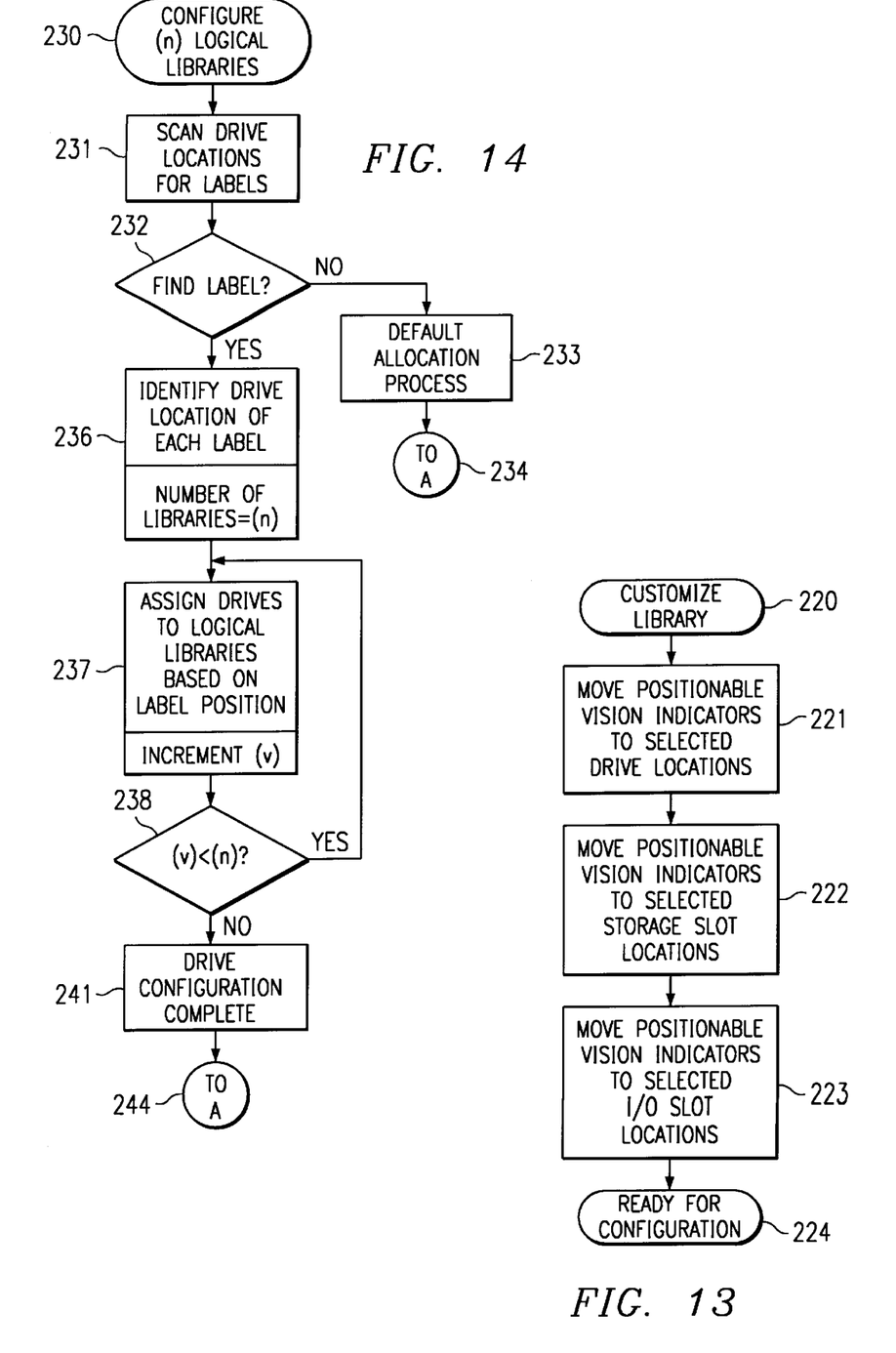
FIG. 13 is a flow chart depicting an embodiment of a method of customizing the library of FIGS. 1 and 2 in accordance with the present invention.
FIGS. 14, 15 and 16 are flow charts depicting an embodiment of a method for configuring the library of FIGS. 1 and 2 in accordance with the present invention.

FIG. 13 illustrates the method of customization of a library, entered at step 220, by moving the positionable vision indicators to selected locations, which will be subsequently examined in an autoconfiguration process. The customization in accordance with the present invention remains available, regardless of loss of controller memory, and may be easily altered by the operator by repositioning of the positionable vision indicators.

In step 221, the operator, at a terminal of a host, at a terminal 62 of the switch 50 in FIG. 3, or at terminal 79 of the library 10 in FIG. 2, instructs the logical library controller 60 or 31 to move, or manually moves, the positionable vision indicators to selected data storage drive locations. If the positionable vision indicators are dummy cartridges, etc., the dummy cartridges are moved to storage slots adjacent the selected drives. If the positionable vision indicators are the positionable vision indicator label supports 130, they are moved to the holders 140 supported by brackets 200 on the selected data storage drives 12, for configuring a logical library with the adjacent data storage drive.

In step 222, the operator manually moves, or instructs the logical library controller 31 or 60 to move, the positionable vision indicators to selected storage slot locations. If the positionable vision indicators are dummy cartridges, etc., they are moved to the storage slots which identify the adjacent contiguous grouping of storage slots for a logical library. If the positionable vision indicators are the positionable vision indicator label supports 130, they are moved to the holders 140 supported by brackets 210 adjacent a selected bank of contiguous storage slots 16, for configuring a logical library with the storage slots.

Step 223 repeats step 222 for optionally configuring the I/O slots 35. The operator may skip any of the steps 221, 222 and 223 to only configure the drives or storage slots or I/O slots, or any combination.

With the customization of the data storage drives 12, and/or storage slots 16, and/or I/O slots 35, step 224 indicates that the customization is complete and the library 10 is ready to be configured.

Configuration of the library 10 begins at step 230 in FIG. 14. The configuration comprises an autoconfiguration into a number (n) of logical libraries, typically equal to the number of hosts 41–43 in FIG. 2, so that each host is associated with a logical library.

In step 231 of FIG. 14, the accessor robot 18 moves the reader 22 to the drive locations which may have storage slots adjacent the data storage drives to read labels on dummy cartridges or to the holders 140 mounted on brackets 200 at the drives, and the reader 22 examines the locations for positionable vision indicators, represented by labels 90. As described above, the reader 22 is positioned to read the label located at the X-Y position of the accessor robot. Thus, the controller locates the label by the X-Y position of the robot. In step 232, if no label is found, a default allocation process 233 is conducted, for example, in accordance with the above IBM 3575 or ATL Products PL50, and step 234 directs the configuration process to the next stage in the configuration process.

If labels have been found and labels read, "YES" in step 232, the data storage drives are identified in step 236 by the locations of the adjacent positionable vision indicators. In step 237, each of the drives are assigned to the selected logical library based on label location.

Step 238 determines whether the total number of logical libraries that have been assigned drives (v) is less than the total number of logical libraries (n). If logical libraries remain, "YES", the process cycles back to step 237. If "NO", the data storage drive configuration is complete, step 241, and step 244 directs the configuration process to the next stage of the configuration process.

It may be, for example in the library of the ATL Products PL50, that the drive locations cannot be scanned, and the configuration process is always conducted by the default allocation process 233, or with dummy cartridges.

Figures 15, 16:
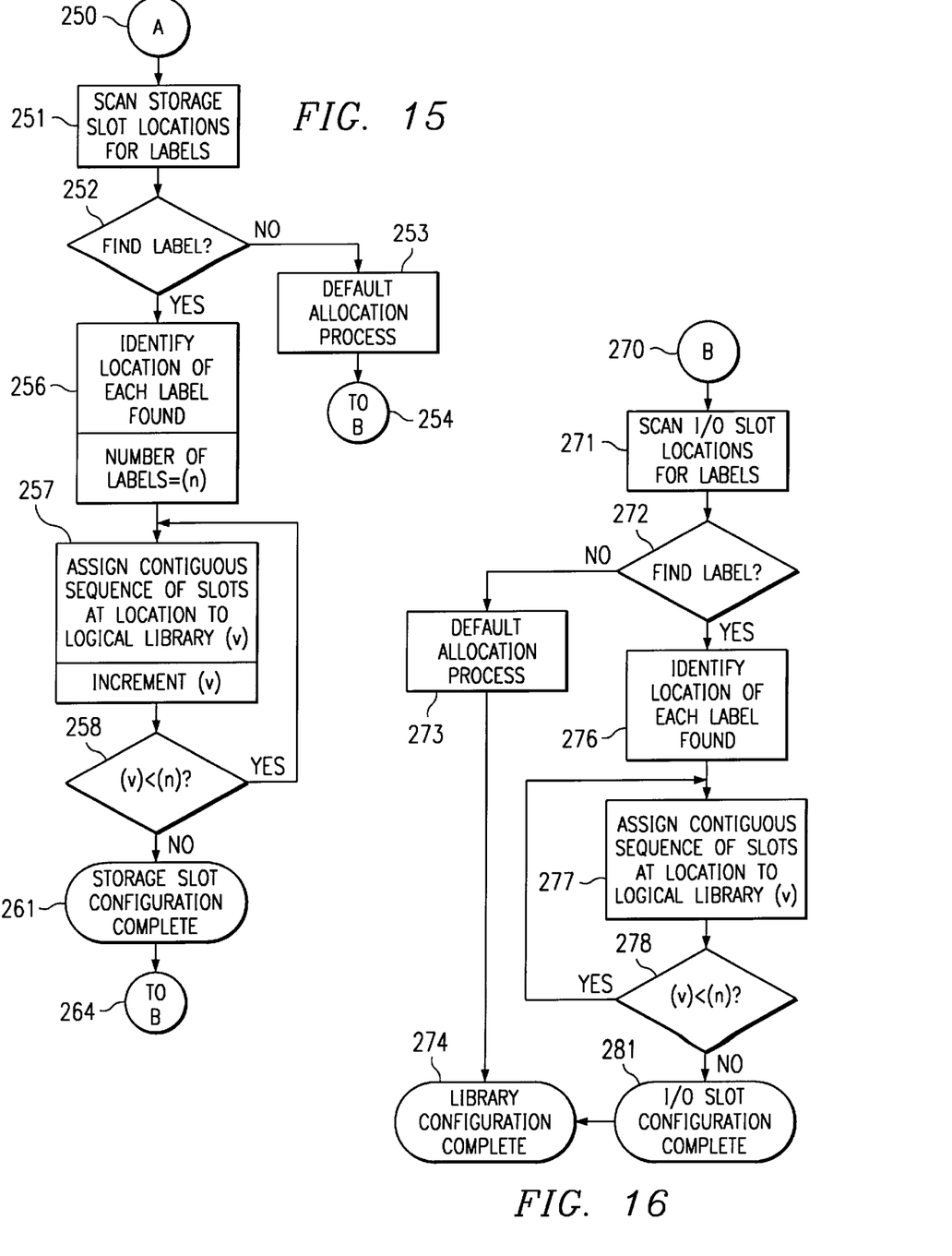

The next stage of the configuration process begins at connector 250 of FIG. 15 and is the optional assignment of the storage slots 16 to the logical libraries. In step 251, the accessor robot 18 moves the reader 22 to scan the storage slots for dummy cartridges, etc., or moves the reader to the holders 140 mounted on brackets 210 at the banks of storage slots, and the reader 22 examines the locations for positionable vision indicators, represented by labels 90. In step 252, if no label is found, a default allocation process 253 is conducted as described above, and step 254 directs the configuration process to the next stage in the configuration process.

If labels have been found and labels read, "YES" in step 252, the location of the storage slots with the dummy cartridges, etc., or the location of the positionable vision indicator label support assemblies at the holders, are identified in step 256. In step 257, contiguous sequences of storage slots identified by the locations are assigned to the selected logical libraries. Step 258 determines the assignment is complete, i.e., whether any remaining logical libraries require assigned storage slots, cycling back to step 257 if logical libraries remain. If "NO", the storage slot configuration is complete, step 261, and step 264 directs the configuration process to the next stage of the configuration process.

The next stage of the configuration process begins at connector 270 of FIG. 16 and is the optional assignment of the I/O slots 35 to the logical libraries. In step 271, the accessor robot 18 moves the reader 22 to scan the I/O slots 35, or moves the reader to the holders 140 mounted on brackets 210 at the banks of I/O slots, and the reader 22 examines the locations for positionable vision indicators, represented by labels 90. In step 272, if no label is found, a default allocation process 273 is conducted as described above, and step 274 indicates that the configuration process is complete.

If labels have been found and labels read, "YES" in step 272, the location of the I/O slots with the dummy cartridges, etc., or the location of the positionable vision indicator label support assemblies at the holders, are identified in step 276. In step 277, contiguous sequences of I/O slots identified by the locations are assigned to the selected logical libraries. Step 278 determines that the assignment is complete, i.e., whether any remaining logical libraries require assigned I/O slots, cycling back to step 277 if logical libraries remain. If "NO", the I/O slot configuration is complete, step 281, and step 274 indicates that the configuration process is complete.

The stages described with respect to FIGS. 14–16 may optionally be conducted in any sequence, and alternative equivalent steps may be envisioned by those of skill in the art.

When completed, referring to FIGS. 1, 2 and 3, the data storage drives 12, storage slots 16 and I/O slots 35 will have been assigned to ones of the logical libraries, thereby configuring the library 10. Should the database of the logical library controller processor 31 or 60 be lost, and the programming be reinstated, for example, by a CD-ROM, the logical library controller 31 or 60 will again conduct the autoconfiguration process of FIGS. 14–16, and the configuration will be correct as originally customized. Alternatively, should the operator wish to recustomize the library, one or more of the positionable vision indicators may be relocated, and the autoconfiguration process conducted.

While the preferred embodiments of the present invention have been illustrated in detail, it should be apparent that modifications and adaptations to those embodiments may occur to one skilled in the art without departing from the scope of the present invention as set forth in the following claims.

We claim:

1. A vision system for partitioning an automated data storage library into multiple logical libraries, said automated data storage library having a plurality of storage slots for storing data storage media, said system comprising:
   a positionable vision indicator having logical library indicia;
   a reader for reading said indicia and for locating said positionable vision indicator; and
   a logical library controller coupled to said reader, assigning, in response to said indicia and said location, a sequential portion of said storage slots adjacent said location to one of said multiple logical libraries.

2. The system of claim 1, wherein said data storage media have media indicia thereon, and wherein said positionable vision indicator comprises a dummy data storage media positionable in said storage slots, and wherein said logical library indicia and said media indicia are both readable by said reader.

3. The system of claim 2, additionally comprising an accessor robot for retrieving said data storage media from and storing said data storage media to selected ones of said storage slots, said accessor robot additionally positioning said dummy data storage media in said storage slots.

4. The system of claim 3, wherein said library additionally comprises a plurality of input/output slots, and wherein said dummy data storage media is positioned in said input/output slots, and wherein said logical library controller additionally assigns, in response to said indicia thereof read by said reader and said location, a sequential portion of said input/output slots adjacent said location to one of said multiple logical libraries.

5. The system of claim 3, additionally comprising an operator panel for instructing said logical library controller to command said accessor robot to position said dummy data storage media in a selected storage slot.

6. A vision system for partitioning an automated data storage library into multiple logical libraries, said automated data storage library having a plurality of storage slots for storing data storage media, said system comprising:
   holders positioned at locations adjacent groups of said storage slots;
   a positionable vision indicator label support having logical library indicia, said label support mountable on said holders;
   a reader for reading said indicia and for locating said positionable vision indicator label supports; and
   a logical library controller coupled to said reader, assigning, in response to said indicia and said location, a sequential portion of said storage slots adjacent said location to one of said multiple logical libraries.

7. The system of claim 6, wherein said positionable vision indicator label support comprises a snap-on label support assembly which is pressed onto and engages said holders.

8. The system of claims 6, wherein said holders comprise an attachment surface, and wherein said positionable vision indicator label support comprises a removably engageable element which is moved into proximity with and engages said holders.

9. The system of claim 6, additionally comprising a plurality of data storage drives for reading and/or writing on said data storage media from said storage slots, said data storage drives having drive holders positioned thereat, wherein said positionable vision indicator label support having said logical library indicia is mountable on said drive holders, and wherein said logical library controller assigns, in response to said indicia and said location, said drive having said positionable vision indicator label support mounted on said drive holder thereof to one of said multiple logical libraries.

10. A vision system for partitioning an automated data storage library into multiple logical libraries, said automated data storage library having a plurality of storage slots for storing data storage media, said data storage media having media labels, said library having an accessor robot for retrieving data storage media from and storing said media to selected ones of said storage slots at specific X-Y locations in said library, and having a reader mounted on said accessor robot and positionable thereby to view said X-Y locations for reading said media labels, said system comprising:
- a positionable vision indicator having logical library indicia;
- said reader mounted on said accessor robot and positionable thereby for locating said positionable vision indicator and for reading said indicia; and
- a logical library controller coupled to said reader for detecting said positionable vision indicator location from the X-Y location of said accessor robot upon said reader reading said indicia thereof, said logical library controller assigning, in response to said indicia and said location, a sequential portion of said storage slots adjacent said location to one of said multiple logical libraries.

11. The system of claim 10, wherein said positionable vision indicator indicia comprises an identification of a specific one of said multiple logical libraries.

12. The system of claim 10, wherein said positionable vision indicator indicia comprises a bar code.

13. A vision system for partitioning an automated data storage library into multiple logical libraries, said automated data storage library having a plurality of storage slots for storing data storage media, said system comprising:
- a plurality of positionable vision indicators, each having logical library indicia;
- a reader for reading said indicia and for locating said positionable vision indicators; and
- a logical library controller coupled to said reader, autoconfiguring, in response to said indicia and said location, said logical libraries, mapping said storage slots to said multiple logical libraries in contiguous sequential groups between said positionable vision indicators.

14. The system of claim 13, wherein said library additionally comprises a plurality of input/output slots, and wherein said positionable vision indicators is positioned at said input/output slots, and wherein said logical library controller additionally autoconfigures, in response to said indicia thereof read by said reader and said location, mapping said input/output slots to ones of said multiple logical libraries in contiguous sequential groups between said positionable vision indicators positioned at said input/output slots.

15. The system of claim 13, wherein said library additionally comprises a plurality of data storage drives for reading and/or writing on said data storage media from said storage slots, wherein said positionable vision indicators are positionable on said drives, and wherein said logical library controller autoconfigures, in response to said indicia and said locations at said drives, said logical libraries, mapping said ones of said drives to said multiple logical libraries based upon said indicia and said locations of said positionable vision indicators at said drives.

16. A method for autoconfiguring an automated data storage library into multiple logical libraries, said automated data storage library having a plurality of storage slots for storing data storage media, comprising the steps of:
- positioning positionable vision indicators, each having logical library indicia, at selected locations at said storage slots;
- reading said indicia and for locating said positionable vision indicators; and
- autoconfiguring, in response to said indicia and said locations, said logical libraries, mapping said storage slots to said multiple logical libraries in contiguous sequential groups between said positionable vision indicators.

17. The method of claim 16, wherein said library additionally comprises a plurality of input/output slots, comprising the additional steps of:
- positioning said positionable vision indicators at locations at said input/output slots; and
- autoconfiguring, in response to said indicia of said input/output slot positionable vision indicators and said locations thereof, mapping said input/output slots to ones of said multiple logical libraries in contiguous sequential groups between said positionable vision indicators positioned at said input/output slots.

18. The method of claim 16, wherein said library additionally comprising a plurality of data storage drives for reading and/or writing on said data storage media from said storage slots, comprising the additional steps of:
- positioning said positionable vision indicators at locations associated with said drives; and
- autoconfiguring, in response to said indicia and said locations at said drives, said logical libraries, mapping ones of said drives to said multiple logical libraries based upon said indicia and said locations of said positionable vision indicators at said drives.

19. The method of claim 16, wherein said library additionally comprises an accessor robot for retrieving said data storage media from and storing said data storage media to selected ones of said storage slots, and wherein said positioning step comprises operating said accessor robot to position said positionable vision indicators at said locations.

20. The method of claim 19, wherein said positioning step additionally comprises instructing said processor to command said accessor robot to position said positionable vision indicators at said locations.

* * * * *